Nov. 20, 1956 A. MESSMAN 2,771,331
FOLDING TYPEWRITER DESK FOR AUTOMOBILES
Filed Jan. 26, 1955 2 Sheets-Sheet 1

INVENTOR
ARTHUR MESSMAN

BY *N. B. Wilson & Co.*

ATTORNEY

Nov. 20, 1956  A. MESSMAN  2,771,331
FOLDING TYPEWRITER DESK FOR AUTOMOBILES
Filed Jan. 26, 1955  2 Sheets-Sheet 2

INVENTOR
ARTHUR MESSMAN
BY
ATTORNEY

United States Patent Office 2,771,331
Patented Nov. 20, 1956

2,711,331
FOLDING TYPEWRITER DESK FOR AUTOMOBILES

Arthur Messman, Enid, Okla.

Application January 26, 1955, Serial No. 484,206

6 Claims. (Cl. 311—21)

This invention relates to collapsible or folding tables for automobiles or other motor vehicles.

The invention contemplates a foldable typewriter supporting desk pivotally mounted beneath the instrument panel of an automobile, truck or the like, and movable from a collapsed out-of-the-way position to an open position in front of the dash for use as a table or desk by a person occupying the front seat of the vehicle.

It frequently happens that real estate men, salesmen and others who use automobiles in the conduct of their business need a portable typewriter or a desk on which they may prepare a lease, make out a report or do other writing while in their cars; and one object of this invention is to provide a device of the character above indicated which when opened up will be strong and sturdy and provide a good sized working area on which a typewriter may be supported or on which writing in long hand may be conveniently done.

Another object is to provide a device of this character having two hingedly connected table sections one of which is pivotally hung from the instrument panel and the other carrying a floor-engaging leg foldable between the two sections when they are not in use, the folded sections being held by a spring clip mounted on the dash or floor so that the device is completely out of the way of persons riding on the front seat.

Another object is to provide a device of this character which is inexpensive to manufacture, easy to install and highly satisfactory to use.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 5 is an exploded perspective view of one of the hinge connections which mount the device on the dashboard; and Fig. 6 is a detail perspective view showing the hinge connection between the supporting leg and the outer table section.

Referring more in detail to the drawings the numeral 10 denotes the instrument panel of an automobile or the like, 11 the floor and 12 the dash or bulkhead, these parts are conventionally illustrated and vary greatly in different models and makes of cars. Usually at the lower edge of the instrument panel there is a horizontally projecting flange or portion 13, and it is on this part that the improved supporting desk or table is hung.

Figure 2:
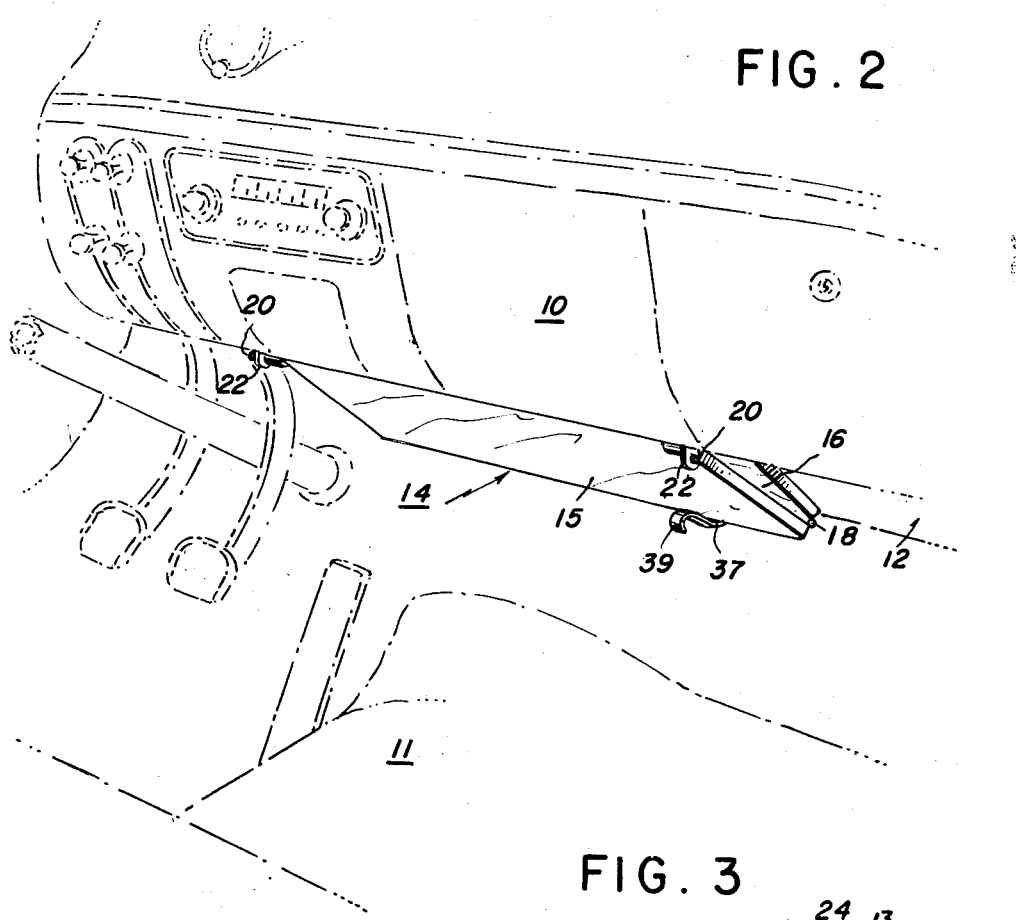
Fig. 2 is a view similar to Fig. 1 showing the device in its folded out of the way position.

The table 14 comprises two hingedly connected sections 15 and 16 one of which is hinged to the instrument panel and the other provided with a single supporting leg 17. The two table sections are preferably of rectangular shape and of the same size. They are connected along adjacent longitudinal edges by strap hinges 18 disposed on their bottom faces so that the outer or free section 15 may swing under the inner or hingedly mounted section 16, as seen in Fig. 2.

The hinge connections between the table and the instrument panel comprise two hinge leaves or plates 19 fastened by screw or other means on the top face of the section 16 at opposite corners of the latter. These plates carry longitudinally alined and oppositely projecting pintles or pivot pins 20. The latter project beyond the end edges of the section and are rotatably received in openings 21 in right angularly bent bearing ears 22 at the ends of elongated hinge straps or plates 23. These plates 23 are disposed in longitudinal alinement against the flange 13 and are adjustably fastened thereto by one or more bolts 24 which pass through slots 25 in the plates and holes in the flange 13. The plates 23 are so disposed and fastened that the table may be readily mounted beneath the panel 10 and as readily removed since when the bolt in the slot of one of the plates is loosened the slot permits the plate to be shifted longitudinally of the flange 13 a distance sufficient to move its bearing ear 22 off of the coacting pivot pin 20. The other pin may then be withdrawn from the other hinge plate 23. This mounting of the section 16 not only permits of quick and easy removal of the desk from the automobile if the latter is to be used on a non-business trip but also permits of limited adjustment of the desk lengthwise of the instrument panel by reason of the slots 25.

Figure 1:
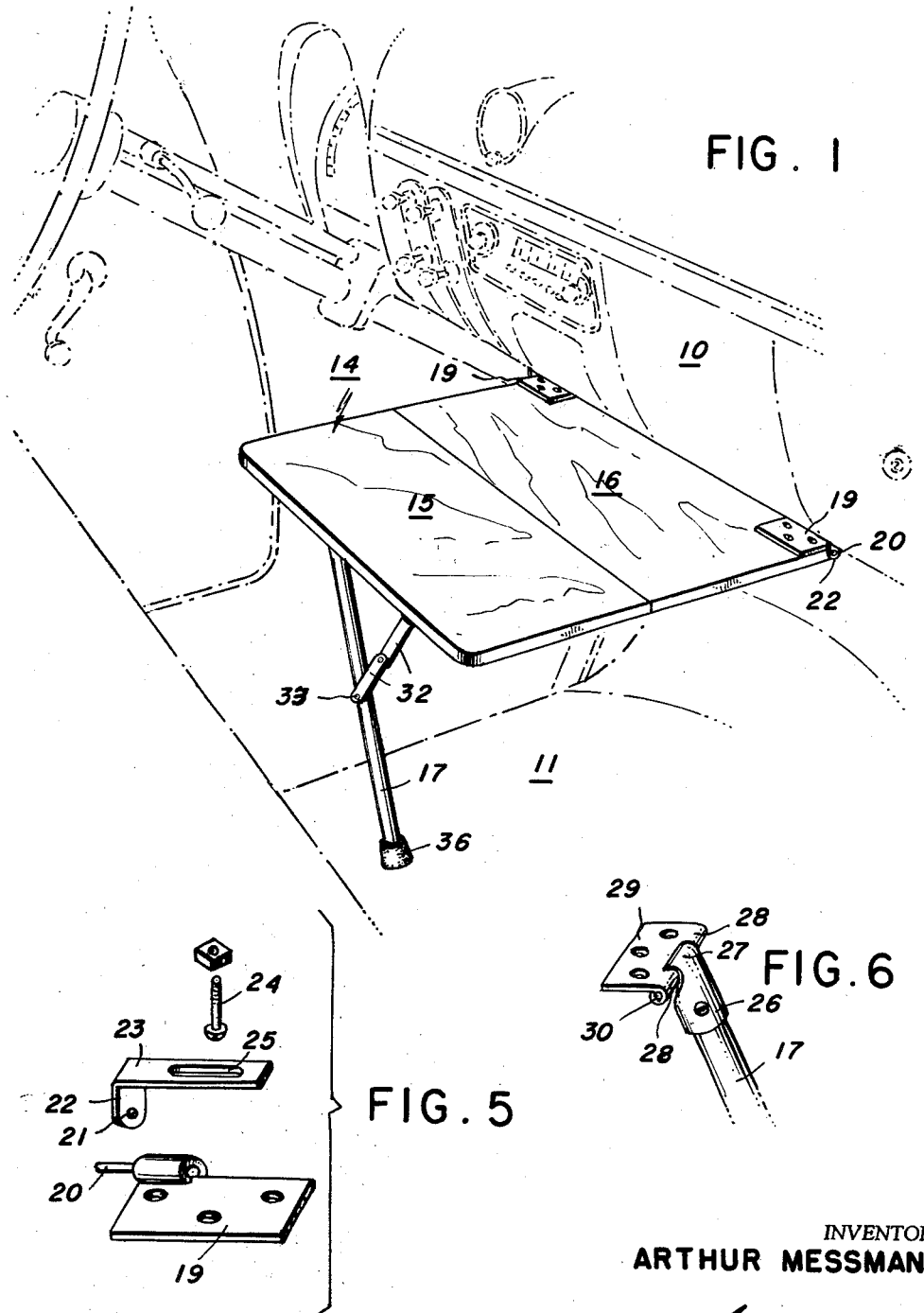
Fig. 1 is a perspective view of the improved device set up for use, portions of an automobile being shown in broken lines.

The table supporting leg 17 may be a rod or tube with a sleeve 26 fixed to one end and formed with a hinge eye 27 to enter between a pair of hinge eyes 28 on a hinge plate 29, the alined ears receiving a pivot pin 30. The plate 29 is screwed or otherwise fastened to the bottom of the table section 15 adjacent the free edge of the latter. This plate 29 is also disposed adjacent one end of the section so that when the leg is in its lowered table-supporting position, it is disposed in the inclined position shown in Figs. 1 and 4 beneath the outer or free edge portion of the section 15 and with the extremity of the leg substantially beneath the central portion of that edge. A foldable strap brace 32 is provided between the intermediate portion of the leg and a point on the section 15 adjacent its end remote from the pivot 30. The leg and its brace thus form an effective Y-shaped prop for the table. It is to be noted that the table or desk when positioned for use is braced both horizontally and vertically since the forward corners of the section 16 are effectively supported by the hinge elements 19—22 while the rear corners of the rear section 15 are effectively supported by the Y-shaped prop. Not only is the desk firmly enough attached and braced to withstand the jar and vibration of a typewriter but the single leg 17 affords a minimum of obstruction to the movement of the legs of the user in the limited space in front of the front seat of the automobile. The brace may be formed by two metal strips pivotally connected together, one being pivoted at 33 to the leg and the other pivoted at 34 to a bracket 35 fastened to the bottom of the section 15. If desired a rubber cap 36 may be applied to the free end of the leg to prevent it marring the floor or a mat or covering on the latter.

Figure 3:
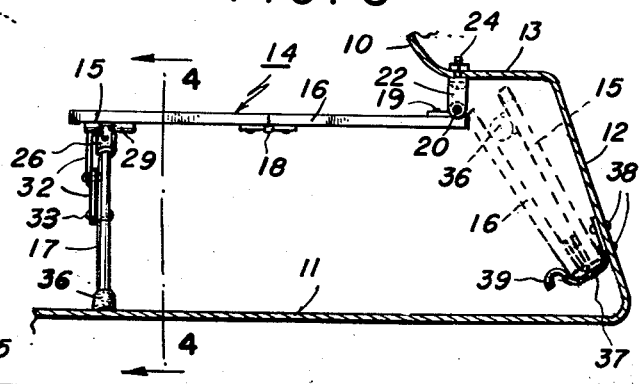
Fig. 3 is an end view on a reduced scale of the device in its set up position seen in Fig. 1, a portion of the automobile being shown in section.
Figure 4:
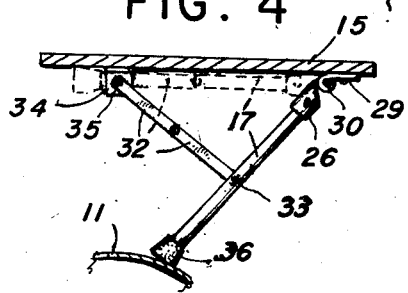
Fig. 4 is a detail section taken on the line 4—4 in Fig. 3 looking in the direction of the arrows.

It will be seen that when the leg and its brace are folded against the bottom of the table section 15, as shown in dotted lines in Fig. 4, the section 15 may be swung on the hinges 18 to a position beneath the section 16; and the thus folded sections, with the leg disposed longitudinally between them, may be swung on the pivots 20 to the out-of-way position under the instrument panel shown in dotted lines in Fig. 3. To retain the folded table in that position a spring clip 37 is secured either to the floor or the dash and so positioned and constructed that the folded sections may be snapped into and out of engagement with it. As shown the retaining clip is a resilient metal strip having one end straight and fastened in an upright position by bolts or other fastening means 38 to the dash 12. The intermediate portion of the strip forms a substantially U-shaped seat to receive the folded table sections, while the other end of the strip is bent to provide a curved fingerpiece 39. The shape of the clip will of course depend upon the shape and location of the rigid portion of the automobile to which it is to be fastened.

It has been found that a device constructed as herein disclosed is sufficiently strong and sturdy that a typewriter may be satisfactorily used upon it. It may also be conveniently used as a writing desk, a lunch table and for various other purposes. When it is folded it is entirely out of the way of the occupants of the front seat, and even when set up it occupies very little space. It is to be further noted that the device is highly practical since it may be produce dat a relatively small cost and may be quickly and easily installed by unskilled labor.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. The combination with an automobile having an instrument panel, of a foldable table having inner and outer substantially rectangular sections, a foldable Y-shaped table support including a single leg to engage the floor of the automobile, means pivotally connecting said support to the bottom of the outer section along its outer longitudinal edge for folding against the same with the leg extending longitudinally of the section, means hingedly connecting adjacent longitudinal edges of the two sections whereby the outer section may fold downwardly under the inner section with the folded leg between them, means hingedly connecting the other longitudinal edge of the inner section to the instrument panel whereby the folded sections may be swung downwardly under that panel with their hingedly connected edges lowermost, and a spring clip carried by a fixed portion of the automobile for engagement with the hingedly connected edges of the sections to hold them in such folded position under the instrument panel.

2. The structure of claim 1 in which said pivoted connecting means includes a pivotal connection between said leg and the bottom of the outer section, and said table support also includes a foldable brace pivotally connected to an intermediate portion of said leg and to the bottom of the outer section, the pivotal connections of the leg and the brace to the outer section being disposed adjacent the outer corners of the outer section.

3. The combination with an automobile having a floor, a dash and an instrument panel with an inturned lower flange, of a foldable table having inner and outer substantially rectangular sections hingedly connected at adjacent longitudinal edges, hinge plates at the free corners of the inner section and having longitudinally alined and oppositely projecting pivot pins, a pair of elongated hinge plates disposed in longitudinal alinement against said flange and having at their adjacent ends apertured ears to receive said pivot pins, said hinge plates having longitudinal slots, bolts passing through said slots and said flange for adjustably securing the hinge plates to said flange, a foldable floor engaging leg pivot to the bottom of said outer section adjacent one of its free corners for disposition in a downwardly inclined table supporting position and foldable to a position against said outer section, a foldable brace having one end pivotally connected to the bottom of the outer section adjacent its other free corner and its other end pivotally connected to an intermediate portion of the leg; and a spring clip fastened at one end to said dash for engagement with said table sections when they are folded and lowered beneath the instrument panel.

4. An automobile table comprising inner and outer rectangular sections, hinge means connecting longitudinal edges of the sections permitting the outer section to fold under the inner section, hinge leaves fastened adjacent the free corners of the inner section and carrying longitudinally alined pivot pins, bracket plates for attachment to the instrument panel of an automobile and having bearing ears to receive said pivot pins, a floor engaging leg pivotally mounted on the bottom of the outer sections adjacent one of its free corners for disposition in a downwardly inclined table supporting position and foldable to a position against said outer section, a foldable brace having one end pivotally connected to the bottom of the outer section adjacent its other free corner and its opposite end pivotally connected to an intermediate portion of the leg, the leg and brace being foldable against the outer section into substantially parallel relation therewith for disposition between the two sections when the latter are folded and swung on said pivot pins to a low position beneath an instrument panel, and a spring clip for mounting on a fixed part of an automobile to receive the folded sections and hold them in a lowered position beneath an instrument panel.

5. The combination with an automobile having an instrument panel, of a foldable desk of a size to support a typewriter at the front of the instrument panel, said desk having substantially rectangular front and rear sections hingedly connected at adjacent longitudinal edges, hinge means at the front corners of the front section pivotally connecting the latter to the instrument panel for downward folding, a foldable Y-shaped support mounted under the rear portion of the rear section and comprising a floor engaging leg and a foldable brace, said leg having an end pivotally connected to said rear section adjacent one of its rear corners and being foldable from a downwardly inclined position to a position substantially parallel with and extending longitudinally of said rear section, said foldable brace having one end pivotally connected to an intermediate portion of said leg and its other end pivotally connected to said rear section adjacent the other rear corner of the latter, said hinged connection between the two sections permitting said rear section to be folded under said front section with the folded leg and brace between them, whereupon said hinge means will permit the folded sections to be swung downwardly beneath the instrument panel, and means retaining the folded sections in their lowered position.

6. The structure of claim 5 in which said hinge means connecting the front corners of the front section to the instrument panel include a pair of longitudinally alined and oppositely projecting pivot pins carried by the corner portions of the section, a pair of right angular hinge plates, each having a short arm apertured to receive one of said pivot pins and a long longitudinally slotted arm disposed in contact with the instrument panel, and long arms projecting in opposite directions longitudinally of the panel, and fastening elements on the panel engaged with said slots, whereby the front panel is detachably and adjustably mounted.

References Cited in the file of this patent

UNITED STATES PATENTS

| | | |
|---|---|---|
| 1,781,977 | Cummings | Nov. 18, 1930 |
| 1,900,325 | Bayman et al. | Mar. 7, 1933 |
| 2,075,936 | Graebner et al. | Apr. 6, 1937 |
| 2,125,476 | Westrope et al. | Aug. 2, 1938 |
| 2,270,948 | Howe | Jan. 27, 1942 |
| 2,471,730 | Doerr | May 31, 1949 |
| 2,475,202 | Sammons | July 5, 1949 |
| 2,584,557 | Cuthbertson | Feb. 5, 1952 |